(12) United States Patent
Peng et al.

(10) Patent No.: US 8,177,379 B2
(45) Date of Patent: May 15, 2012

(54) LCD DEVICE, BACKLIGHT MODULE THEREOF WITH PARTITION WALL AND METHOD FOR MANUFACTURING THE SAME

(75) Inventors: Ci-Guang Peng, Hsin-Chu (TW); Shin-Chin Tseng, Hsin-Chu (TW); Chih-Kuang Chen, Hsin-Chu (TW); Chung Peng, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 315 days.

(21) Appl. No.: 12/266,735

(22) Filed: Nov. 7, 2008

(65) Prior Publication Data

US 2009/0128741 A1 May 21, 2009

(30) Foreign Application Priority Data

Nov. 9, 2007 (TW) .............................. 96142463 A

(51) Int. Cl.
*G09F 13/04* (2006.01)
(52) U.S. Cl. ..................... 362/97.2; 362/97.3
(58) Field of Classification Search ......... 362/97.2–97.3
See application file for complete search history.

(56) References Cited

U.S. PATENT DOCUMENTS

| 7,636,138 | B2 * | 12/2009 | Seong et al. | 349/62 |
| 7,760,291 | B2 * | 7/2010 | Morita et al. | 349/69 |
| 2005/0045897 | A1 | 3/2005 | Chou et al. | |
| 2005/0225960 | A1 * | 10/2005 | Tsai | 362/23 |
| 2005/0226005 | A1 * | 10/2005 | Yang | 362/634 |
| 2006/0170645 | A1 | 8/2006 | Fisekovic et al. | |
| 2006/0221612 | A1 | 10/2006 | Song et al. | |
| 2006/0256256 | A1 | 11/2006 | Seong et al. | |
| 2008/0170178 | A1 * | 7/2008 | Kubota et al. | 349/65 |
| 2009/0140656 | A1 | 6/2009 | Kohashikawa et al. | |

FOREIGN PATENT DOCUMENTS

| CN | 1862343 | 11/2006 |
| TW | 200707011 | 2/2007 |
| WO | WO2005/111496 | * 11/2005 |

OTHER PUBLICATIONS

Chinese language office action date Aug. 22, 2008.
English language translation of abstract of I220076.
English language translation of abstract of TW 248538.
Taiwan Office Action dated Dec. 23, 2011.

* cited by examiner

*Primary Examiner* — Diane Lee
*Assistant Examiner* — Sean Gramling
(74) *Attorney, Agent, or Firm* — Thomas, Kayden, Horstemeyer & Risley, LLP

(57) ABSTRACT

A backlight module, a liquid crystal display using the backlight module, and a manufacturing method thereof are provided. The backlight module includes a bottom plate, a plurality of light source sets and at least one partition wall. A plurality of lighting areas is formed on the bottom plate and light source sets are disposed on the lighting areas, respectively. The partition wall is disposed on the bottom plate and between each two adjacent lighting areas to fully or partially block/reflect the light emitted from the lighting areas. The partition wall includes a first light-penetrable wall and a light reflective layer formed on a wall surface of first light-penetrable wall. The light reflective layer is erected on the bottom plate through the support provided by the first light-penetrable wall and its wall surface.

23 Claims, 15 Drawing Sheets

LCD DEVICE, BACKLIGHT MODULE THEREOF WITH PARTITION WALL AND METHOD FOR MANUFACTURING THE SAME

BACKGROUND OF THE INVENTION

1. Field of the Invention

This invention relates to a backlight module, the liquid crystal display device using the backlight module and the manufacturing method thereof; particularly, the present invention relates to a backlight module having partition walls, the liquid crystal display using the backlight module and the manufacturing method thereof.

2. Description of the Prior Art

Backlight module is widely used in liquid crystal display device, computer keyboard, mobile phone key pad, advertising signs and other devices that need light sources in order to provide the light source that is needed by such devices. Especially, in recent years, the demand for liquid crystal display device has greatly increased and in order to meet the requirements of the functionality and appearance of the liquid crystal display device, the backlight module used by the liquid crystal display is diversified gradually.

Take liquid crystal display as an example, in order to improve the quality and the processing speed of dynamic image, the dynamic local dimming technology is introduced to the backlight module of the liquid crystal display. As FIG. 1 shows, in the backlight module 10 using dynamic local dimming technology, the partition structure 30 is disposed on the bottom plate 11. The partition structure 30 divides the backlight module 10 into several areas 20; and each area 20 comprises several light sources 21. By establishing the partition structure 30, the system can adjust the brightness of each area 20 and reduce the interference in the brightness from adjacent areas 20.

However in this design depicted in FIG. 1, because the partition structure 30 has a certain thickness and the light emitted from the backlight module 10 at the position of the partition structure 30 is weaker. In other words, dark areas are likely to occur in the image generated by the display panel at the position corresponding to the partition structure 30, which would affect the overall quality of the image.

SUMMARY OF THE INVENTION

It is an object of the present invention to provide a backlight module and the manufacturing method thereof to reduce the occurrences of the dark areas in the generated light.

It is another object of the present invention to provide a backlight module and the manufacturing method thereof, which can be applied to the liquid crystal display devices utilizing dynamic local dimming or scanning type liquid crystal display device.

It is yet another object of the present invention to provide a liquid crystal display device to avoid the occurrence of the dark areas in the generated images.

The liquid crystal display comprises a display panel and a backlight module. The display panel is positioned on the backlight module; after the light emitted from the backlight module enters the display panel, the image is displayed on the display surface through the liquid crystal layer of the display panel. The backlight module includes the bottom plate, a plurality of light source sets and at least one partition wall. The bottom plate comprises a plurality of lighting areas; the light source sets are positioned on each lighting area. The partition wall is positioned on the bottom plate and located between each two adjacent lighting areas.

The partition wall comprises a first light-penetrable wall and a light reflective layer. The first light-penetrable wall is positioned on the bottom plate and has a wall surface perpendicular to the bottom plate. The light reflective layer is formed on the wall surface of the first light-penetrable wall. Due to the supporting force from the first light-penetrable wall and from the wall surface, the light reflective wall is disposed vertically on the bottom plate. By means of the position of the light reflective layer, the light emitted from the two adjacent lighting areas can be partially or completely blocked or reflected to adjust the brightness of the backlight of each separate area. Moreover, because the light reflective layer is positioned in conjunction with the first light-penetrable wall and the first light-penetrable wall is mainly used as a supporting structure, the thickness of the light reflective layer can be relatively reduced to reduce the occurrence of the dark areas in light that results from the thickness of the light reflective layer. Due to the light penetrable characteristic of the first light penetrable walls, its thickness is less likely to result in dark areas in the backlight emitting outward.

The manufacturing method of backlight module of this invention comprises the following steps: providing a bottom plate having a plurality of lighting areas thereon; disposing a plurality of light source sets on the lighting areas, respectively; providing a first light-penetrable wall; forming a light reflective layer on a wall surface of the first light-penetrable wall to form a partition wall; and disposing the partition wall between each two adjacent lighting areas.

DETAILED DESCRIPTION OF THE PREFERRED EMBODIMENT

The present invention provides a backlight module and a liquid crystal display device using the backlight module. In more preferred embodiments, this invention provides a manufacture method of the backlight module mentioned above. As for the preferred embodiment, the above-mentioned backlight module is provided for the use in liquid crystal display device. However, in other embodiments, the backlight module can also be provided for the use in computer keyboards, mobile phone key pads, advertising signs and other devices that need planar light source. The liquid crystal display device of the present invention is preferred to comprise liquid crystal display device utilizing dynamic local dimming technology or liquid crystal display device having scanning-type backlight. The applications of the liquid crystal display device can include liquid crystal display televisions, liquid crystal monitors for personal computers and laptops and the liquid crystal displays for the mobile phones and digital cameras, etc.

Figure 1:
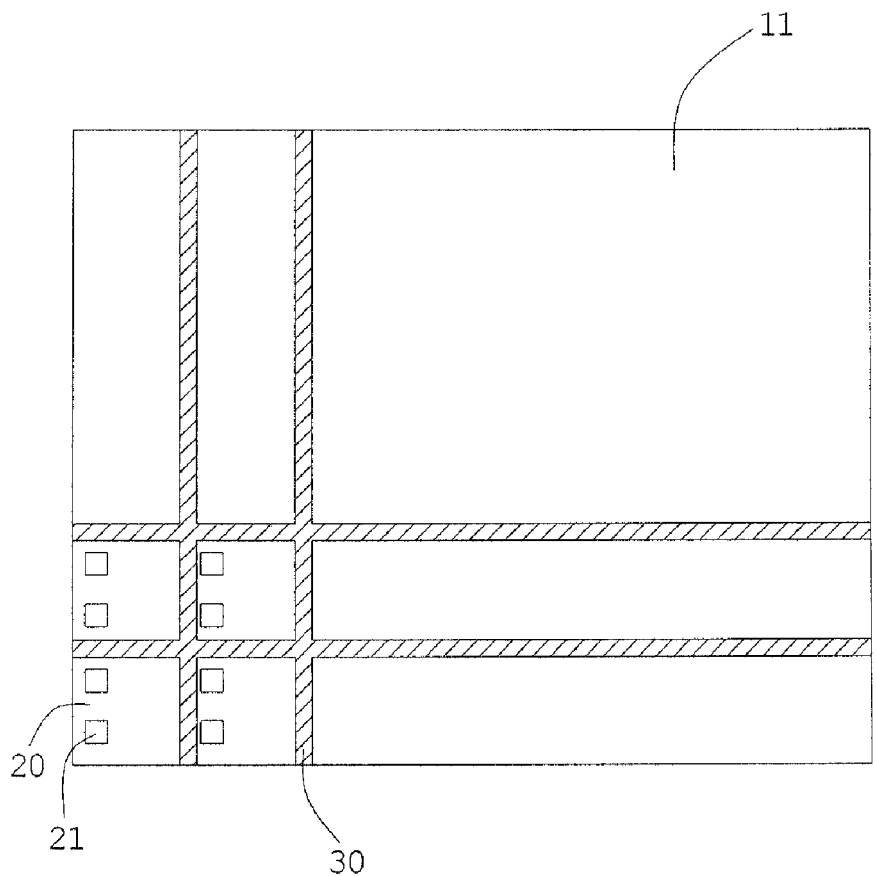
FIG. 1 is a perspective view illustrating the backlight module used in traditional liquid crystal display devices.
Figure 2:
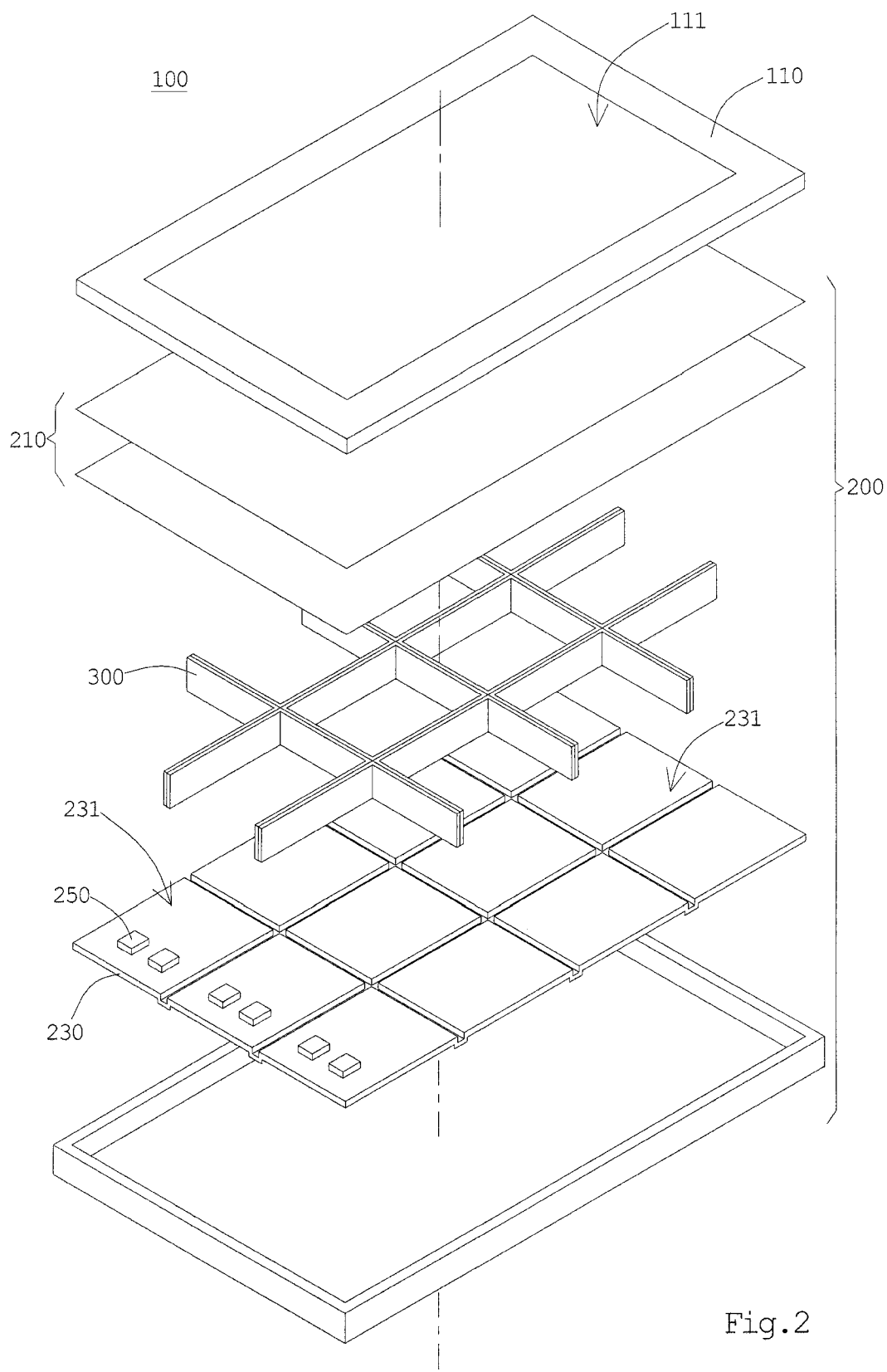
FIG. 2 is an exploded view of an embodiment of the display device of the present invention.

As shown in FIG. 2, liquid crystal display device 100 comprises a display panel 110 and a backlight module 200. The display panel 110 is positioned on the backlight module 200; the light emitted from the backlight module 200 will pass through the liquid crystal layer after entering the display panel 110 and then display the image on the display surface 111. The backlight module 200 preferably includes an optical film 210, such as diffuser, brightness enhancing film (BEF), polarizer, etc. The light generated by the backlight module 200 enters the display panel 110 after being processed by the optical film 210. However, in other embodiments, there could also be no optical film 210 disposed in the backlight module 200.

In the embodiment illustrated in FIG. 2, the backlight module 200 comprises a bottom plate 230, a plurality of light source sets 250 and at least one partition wall 300. A plurality of lighting areas 231 are formed on the bottom plate 230; the light source sets 250 are positioned in each of the lighting areas 231 (illustrated in FIG. 2). The partition wall 300 is positioned on the bottom plate 230, and located respectively between each two adjacent lighting areas 231. The partition wall 300 is preferably perpendicular to the bottom plate 230, and extends from the bottom plate 230 towards the display panel 110. By positioning the partition wall 300, the bottom plate 230 can be divided into a plurality of lighting areas 231. Moreover, the positioning of the partition wall 300 can at least partially block the light emitted by the light source sets 250 of the lighting areas 231 from entering other adjacent or non-adjacent lighting areas 231.

In the preferred embodiment, a reflective layer can be positioned on the bottom plate 230. The reflective layer can be formed on the bottom plate 230 through attaching or coating. The bottom plate 230 is preferably made of metal; however, in other embodiments, the bottom plate 230 can also be made of plastic or other materials. The light source set 250 preferably comprises a plurality of light sources. In the preferred embodiment, the light source is light emitting diode. However, the light sources could also be formed by other lighting bodies such as fluorescent tubes.

Figure 3:
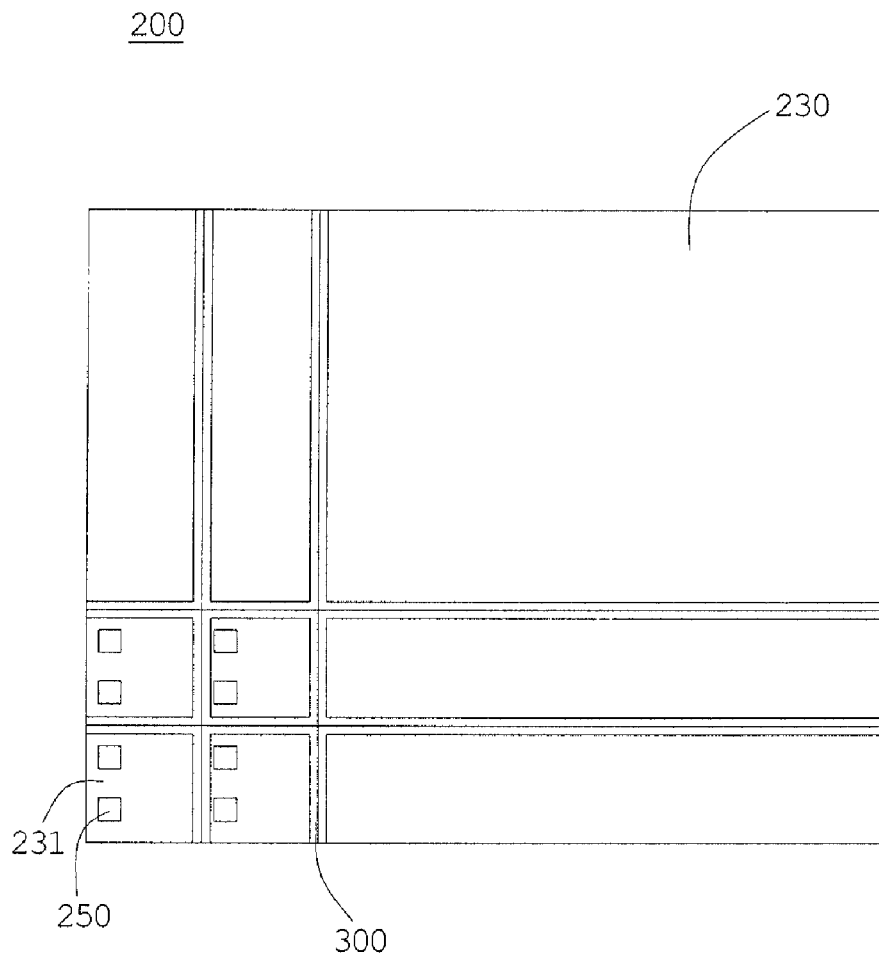
FIG. 3 is a top view illustrating an embodiment of the backlight module of the present invention.

In the embodiment shown in FIG. 3, a plurality of lighting areas 231 is disposed in an array distributed on the bottom plate 230. The disposition of the array includes vertical array and non-vertical array. As illustrated in FIG. 3, when the lighting areas 231 are arranged in the array that the rows and the columns are perpendicular to each other, each lighting area 231 is in the shape of rectangular or square; however, if the lighting areas 231 are arranged in the array having rows and columns not perpendicular to each other, each lighting area 231 could be parallelogram or rhombus. Additionally, in other embodiments, the lighting areas 231 could also exist in the shape of hexagon, octagon, or other polygon and be arranged on the bottom plate 230.

In order to accommodate the array distribution or other polygon distribution of the lighting areas 231, the partition wall 300 is formed in a lattice structure for the differentiation of adjacent lighting areas 231. In this embodiment, as depicted in FIG. 3, the partition wall 300 having the lattice structure is preferably made in one piece; however, in other embodiments, the partition wall 300 having a lattice structure could also include a plurality of plate-shaped partition walls 300.

Figure 4:
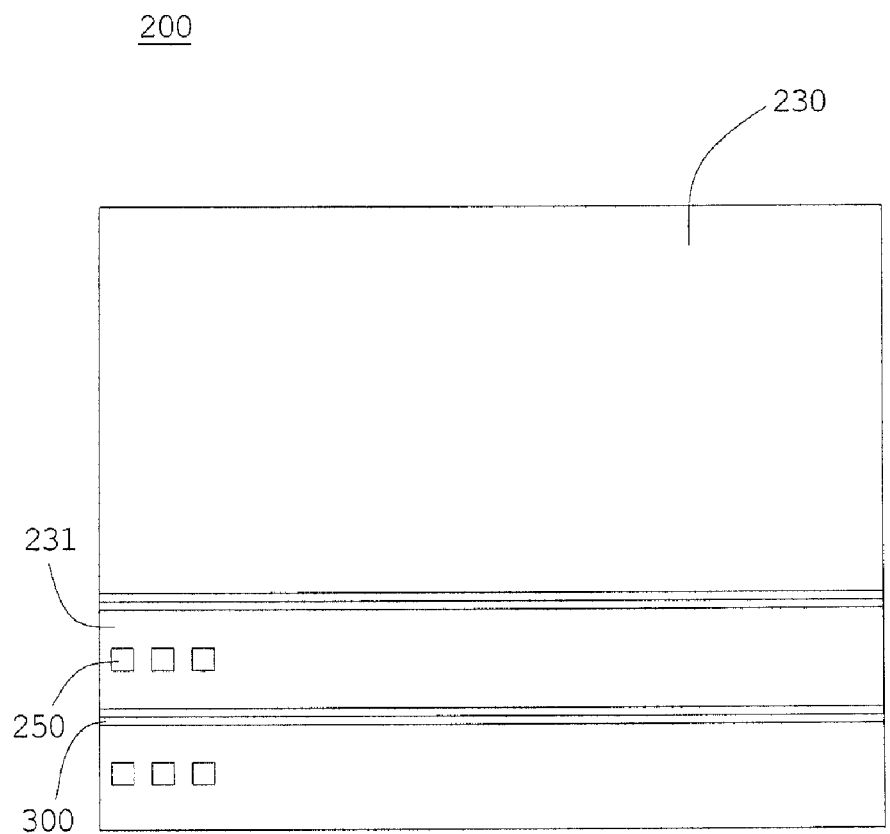
FIG. 4 is a top view illustrating another embodiment of the backlight module.

In the embodiment shown in FIG. 3, each lighting area 231 is arranged in an array, and the light source sets 250 therein can adjust their brightness in accordance with their distribution areas or the image output signals driving the light source sets 250. However, in the embodiment illustrated in FIG. 4, each lighting area 231 can also be distributed in parallel on the bottom plate 230. At the same time, each lighting area 231 extends along the same direction and forms the rows or columns that are parallel to each other; each lighting area 231 is preferably connected to both opposite ends of the bottom plate 230. Under the above-mentioned arrangement, the light source sets 250 of each lighting area 231 on the bottom plate 230 can adjust its brightness by scanning. In order to accommodate the distribution of lighting areas 231, the partition walls 300 are formed in strips and distributed along the boundaries of each lighting area 231.

Figure 5:
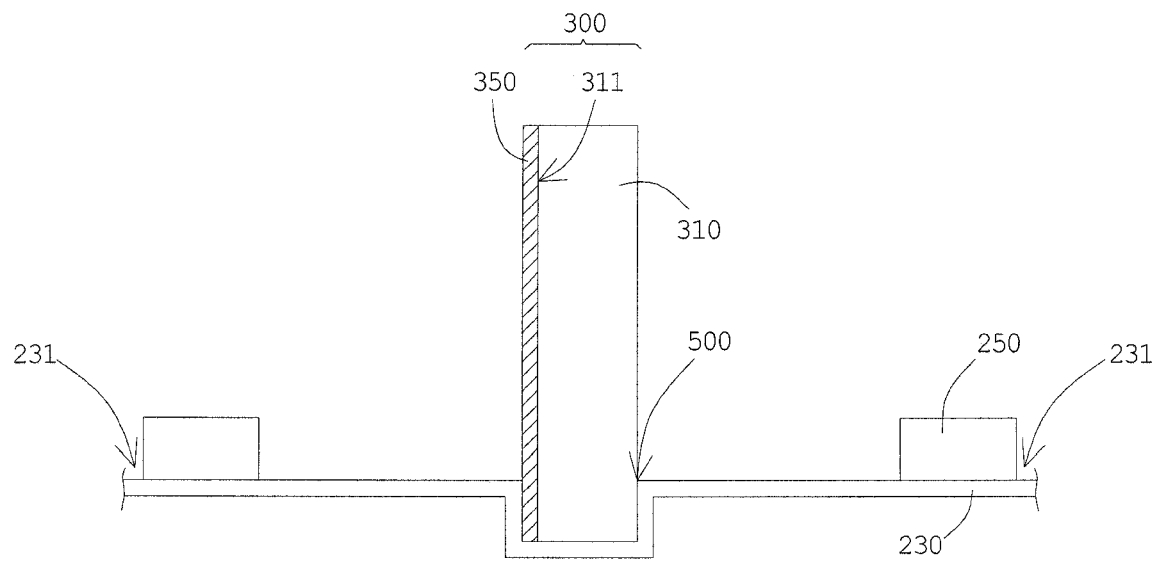
FIG. 5 is a cross-sectional view illustrating an embodiment of the partition walls.

In the embodiment shown in FIG. 5, the partition wall 300 comprises the first light-penetrable wall 310 and the light reflective layer 350. The first light-penetrable wall 310 is positioned on the bottom plate 230 with a wall surface 311 perpendicular to the bottom plate 230. In the preferred embodiment, the first light-penetrable wall 310 is perpendicular to the bottom plate 230; however, the angle between the first light-penetrable wall 310 and the bottom plate 230 can also be adjusted in accordance with the need of design. Furthermore, the first light-penetrable wall 310 is distributed along the edges of the lighting area 231. As shown in FIG. 5, the first light-penetrable wall 310 is positioned at the boundary of the two adjacent lighting areas 231 to separate the two adjacent lighting areas 231. The first light-penetrable wall 310 is preferably made from polymethylmethacrylate (PMMA); however, the first light-penetrable wall 310 can also be made from Polycarbonate (PC), glass, polystyrene (PS), the compound of methyl acrylate, methyl acrylate and polystyrene (MS), and other organic or inorganic light-penetrable material or mixtures thereof.

In the preferred embodiment, the thickness of the first light-penetrable walls 310 is greater than about 0.2 mm to facilitate the manufacturing process. Generally, for the convenience of design and economy of material, the thickness of the first light-penetrable wall 310 can also be less than about 3 mm; the thickness of the first light-penetrable wall 310 is preferably about 0.5 mm. The height of the first light-penetrable walls 310 and that of the partition wall 300 can be selectively adjusted in accordance with the size of the lighting areas 231, which can also be adjusted in accordance with the brightness, quantity, spacing between and optical behavior of the light source sets 250 positioned in the lighting areas 231. Furthermore, the height of the first light-penetrable wall 310 and that of the partition wall 300 can be selectively adjusted to be able to make contact with the optical film 210; however, in different embodiments, the partition wall 300 can also not be in contact with the optical film 210.

As shown in FIG. 5, the light reflective layer 350 is formed on one wall surface 311 of the first light-penetrable wall 310. Due to the support of the first light-penetrable wall 310 and the wall surface 311, the light reflective layer 350 is able to be positioned upright on the bottom plate 230. By positioning the light reflective layer 350 on the bottom plate 230, the light emitted from the two adjacent lighting areas 231 can be partially or completely blocked or reflected to control the backlight brightness in each separate area; in other words, part of light is blocked or reflected by the light reflective layer 350 after being entering the first light-penetrable wall 310. In addition, because the light reflective layer 350 is positioned correspondingly with the first light-penetrable wall 310 and also that the first light-penetrable wall 310 is used as the main supporting structure; therefore, the thickness of the light reflective layer 350 can be relatively reduced to decrease the possible occurrences of dark areas in light. Because of the light penetrable characteristic of the first light-penetrable wall 310, it's less likely for the thickness of the first light-penetrable wall 310 to cause the occurrence of dark areas in the emitted backlight.

In the preferred embodiment, the light reflective layer 350 is a reflective film applied or coated on the wall surface 311. The material of light reflective layer 350 can include magnesium oxide compounds, titanium oxide compounds, and other reflective organic or inorganic material. However, in other embodiments, the light reflective layer 350 can also be the plate-shaped reflective material attached to the wall surface 311 such as diffusion reflective layer or metallic reflective layer; wherein the diffusion reflective layer preferably comprises silica or other material; and the metallic reflective layer can preferably comprises silver, mixtures thereof or other compounds.

Figure 6:
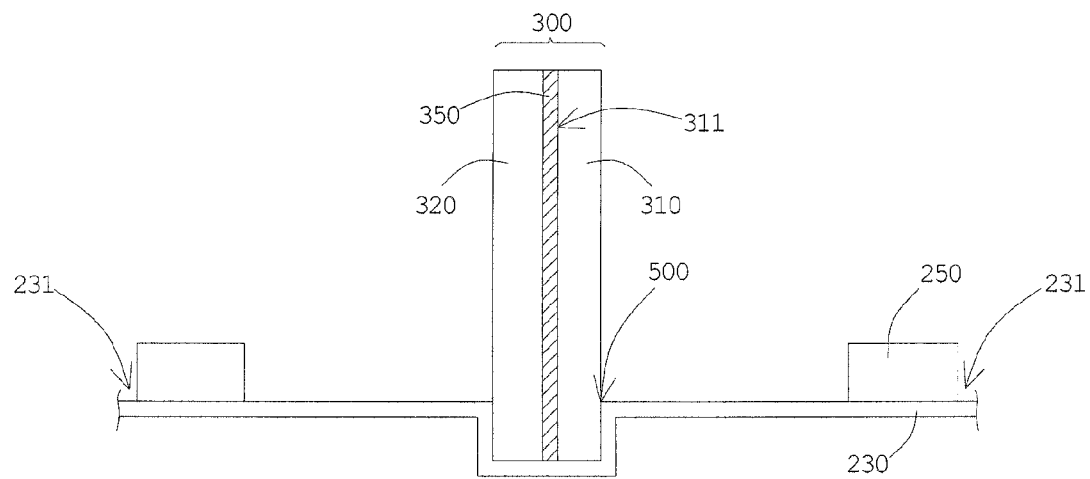
FIG. 6 is cross-sectional view illustrating another embodiment of the partition walls.

In the embodiment illustrated in FIG. 6, the partition wall 300 further comprises a second light-penetrable wall 320. The second light-penetrable wall 320 is positioned abreast with the first light-penetrable wall 310, and they constitute the partition wall 300. The second light-penetrable wall 320 is preferably perpendicular to the bottom plate 230 and extends towards the optical film 210. The light reflective layer 350 is disposed between the first light-penetrable wall 310 and the second light-penetrable wall 320. Part of the light is blocked or reflected by the light reflective layer 350 after entering the second light-penetrable wall 320. Moreover, because the first light-penetrable wall 310 and the second light-penetrable wall 320 are mainly used as the main supporting structure of the light reflective layer 350; therefore, the thickness of the light reflective layer 350 can be relatively reduced to decrease the possible occurrences of the dark areas caused by the thickness of the light reflective layer 350. Because of the light-penetrable characteristic of the first light-penetrable wall 310 and that of the second light-penetrable wall 320, it is less likely for the thickness of the layer to cause the occurrences of dark areas in the backlight emitted outward.

In the preferred embodiment, the light reflective layer 350 is attached to the first light-penetrable wall 310 and the second light-penetrable wall 320. As illustrated in FIG. 6, the first light-penetrable wall 310 and the second light-penetrable wall 320 are of the same structure and are symmetrically positioned with respect to the light reflective layer 350. However, in other embodiments, the first light-penetrable wall 310 and the second light-penetrable wall 320 can also be different in structure designs. The second light-penetrable wall 320 is preferably made from polymethylmethacrylate (PMMA); however, the second light-penetrable wall 320 can also be made from Polycarbonate (PC), glass, polystyrene (PS), the compound of methyl acrylate, methyl acrylate and polystyrene (MS), and other organic or inorganic light-penetrable materials or combinations thereof.

In the preferred embodiment, the thickness of the second light-penetrable walls 320 is greater than about 0.2 mm, so as to facilitate the manufacturing process. Generally, the thickness of the second light-penetrable wall 320 can also be less than about 3 mm for the convenience of design and the economy of material; the thickness of the second light-penetrable wall 320 is preferably about 0.5 mm. The height of the second light-penetrable wall 320 can be selectively adjusted in accordance with the size of the lighting area 231 or in accordance with the brightness, amount, spacing and optics behavior of the light source sets 250 disposed within the lighting areas 231. Furthermore, the height of the second light-penetrable wall 320 can be selectively adjusted to be able to make contact with the optical film 210.

Figure 7:
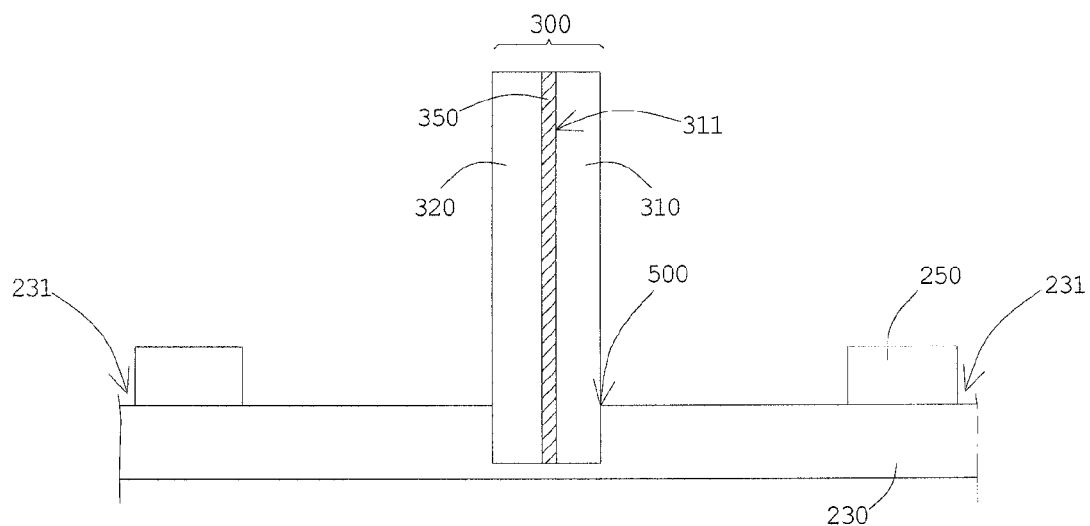
FIG. 7 is a cross-sectional view illustrating another embodiment of the back plate.

As illustrated in FIG. 5 and FIG. 6, there is at least one trough 500 formed on the bottom plate 230. In this preferred embodiment, the trough 500 is formed by bending or denting the bottom plate 230. However, in different embodiments such as the one illustrated in FIG. 7, the trough 500 can also be formed on the bottom plate 230 by means of bore, injection molding or other methods. The trough 500 is located between the adjacent lighting areas 231, and the position of the trough 500 is corresponding to the bottom of the partition wall 300. In other words, the extending direction and the position of the trough 500 correspond to those of the partition wall 300. The bottom end of the partition wall 300 is accommodated in the trough 500, and the partition wall 300 is able to be connected to the bottom plate 230 by means of the support and fixation by the inner surface of the trough 500.

In the embodiment shown in FIG. 5, the bottom end of the first light-penetrable wall 310 is disposed in the trough 500. The inside wall of the trough 500 is attached to the first light-penetrable wall 310 to support or fix the first light-penetrable wall 310. Certain part of the light reflective layer 350 can extend into the trough 500, but it can also selectively not be extended into the trough 500. In the embodiment illustrated in FIG. 6, the first light-penetrable wall 310 and the second light-penetrable wall 320 are both accommodated in the trough 500, thus the trough 500 can clamp the first light-penetrable wall 310 and the second light-penetrable wall 320 to prevent them from separating.

Figure 8A:
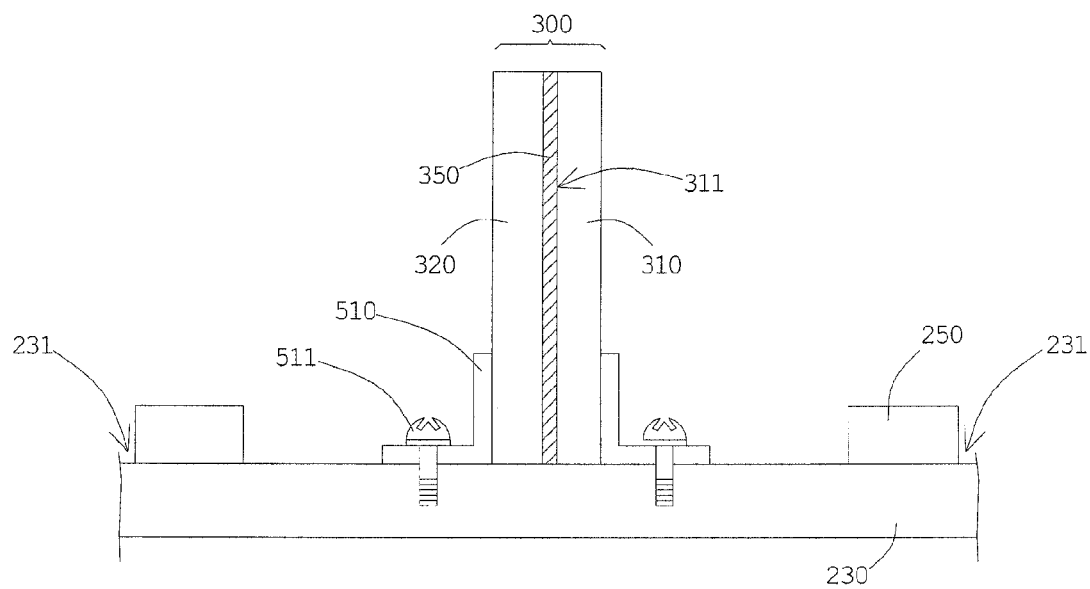
FIG. 8a is a perspective view illustrating an embodiment in which the partition walls are connected to the back plate.
Figure 8B:
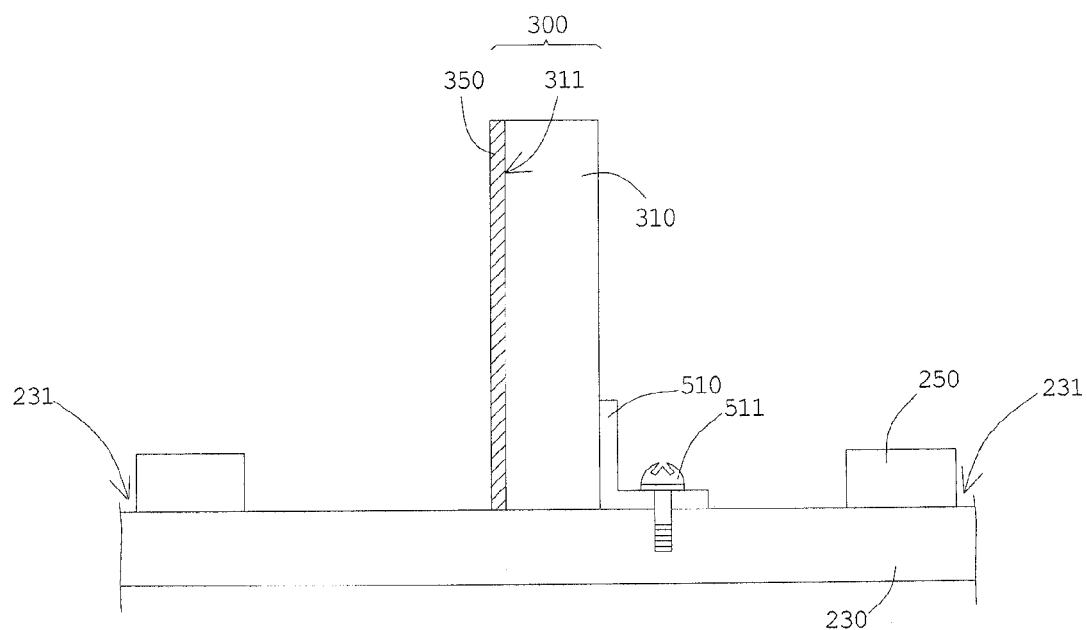
FIG. 8b is a perspective view illustrating another embodiment in which the partition walls are connected to the back plate.

As shown in FIG. 8a, the fixing members 510 can also be added on the bottom plate 230 in the backlight module. In this embodiment, the fixing members 510 are preferably bent structures having an angle the same as the angle between the partition wall and the bottom plate and positioned in pair to clamp the partition wall 300 from both sides. One end of the fixing member 510 is in contact with the partition wall 300 and supports or fixes the partition wall 300; while the other end of the fixing member 510 is in contact with the bottom plate 230 in order to be fixed on the bottom plate 230. As shown in FIG. 8a, the fixing member 510 is attached to the bottom plate 230 by means of screw 511 or rivet. However, in other embodiments, fixing member 510 can also be adhered or fixed to the bottom plate 230 using other methods. Moreover, in the embodiment shown in FIG. 8b, the partition wall 300 can also be fixed by a single fixing member 510, but the part of fixing member 510 to be attached to the partition walls 300 has to be fixed using adhesive or other locking techniques.

Figure 9:
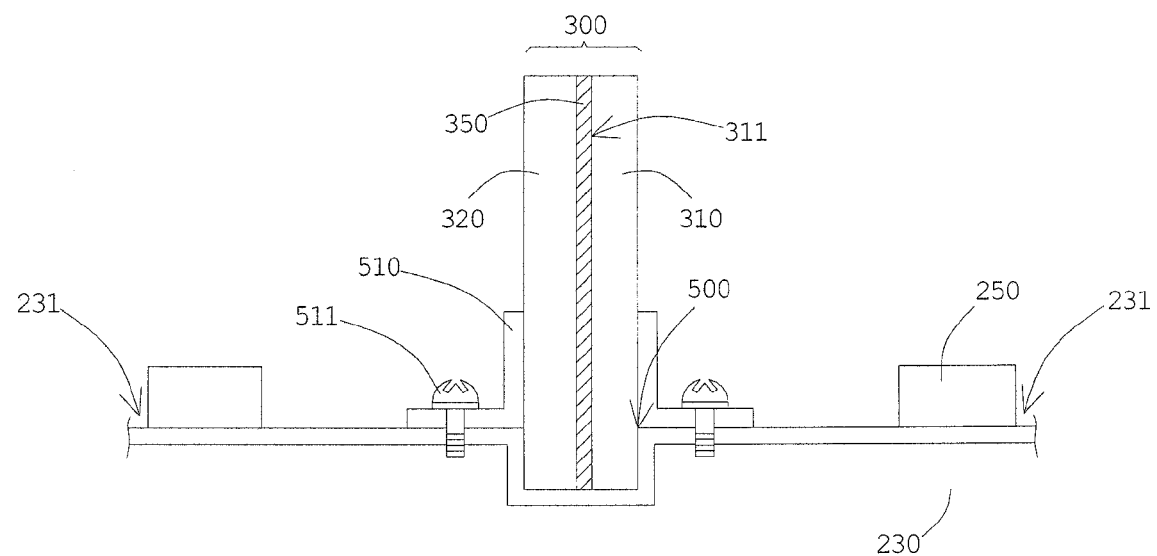
FIG. 9 is a perspective view illustrating yet another embodiment in which the partition walls are connected to the back plate.

In the embodiment shown in FIG. 9, there is a trough 500 formed on the bottom plate 230, and the fixing members 510 are also disposed on the bottom plate 230. At the same time, the fixing members 510 are positioned at the opening edges of the trough 500 to support the partition wall 300 disposed in the trough 500. The fixing member 510 is preferably made of metal; however, in other embodiments, the fixing member 510 can also be made of plastic or other material. Furthermore, the partition wall 300 can also be directly adhered to the bottom plate 230 or fixed to the bottom plate 230 in other ways without having the trough 500 and the fixing member 510.

Figure 10A:
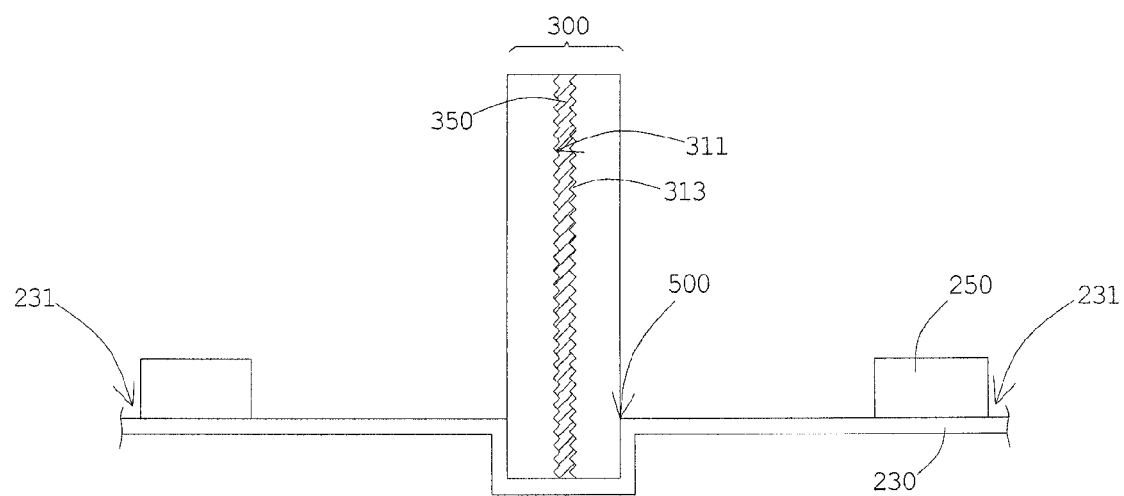
FIG. 10a is a perspective view illustrating an embodiment in which the partition walls comprise microstructures.
Figure 10B:
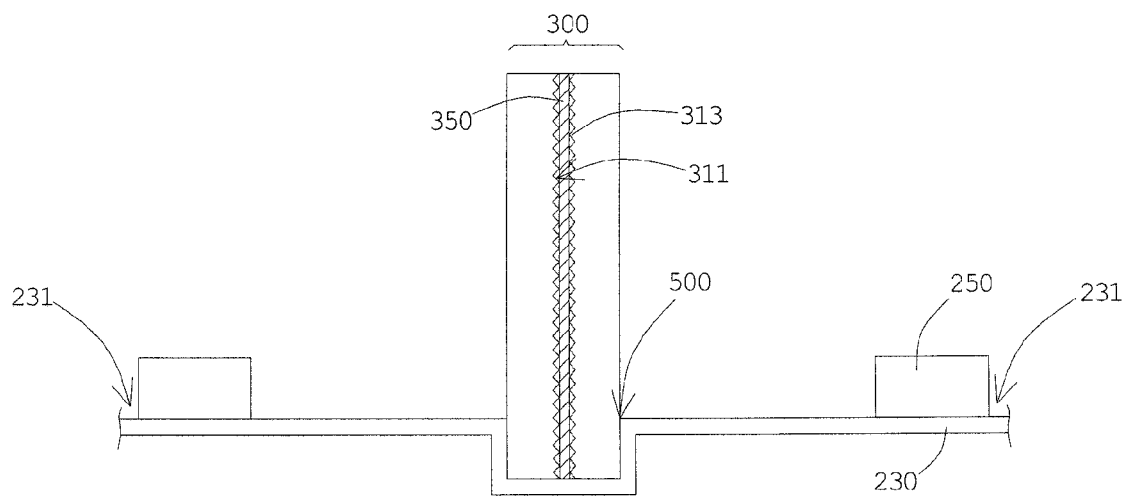
FIG. 10b is a perspective view illustrating another embodiment in which the partition walls comprise microstructure.
Figure 10C:
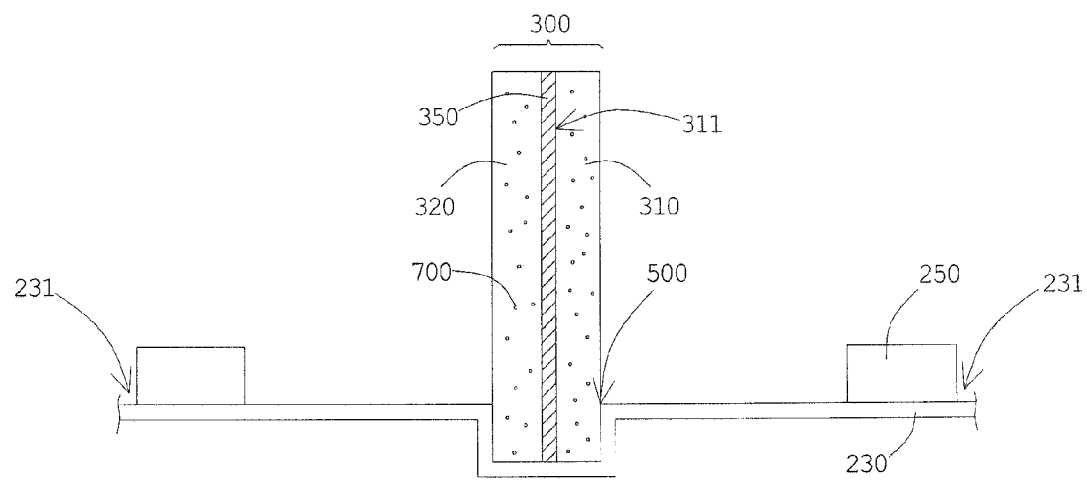
FIG. 10c is a perspective view illustrating an embodiment in which the partition walls that comprise grains.

As illustrated in FIG. 10a, an optical microstructure 313 can be formed on the wall surface 311 of the first light-penetrable wall 310 or on the wall surface of the second light-penetrable wall 320 facing the light reflective layer 350. The microstructure 313 includes prism structure, thread-like structure, wavy structure or other structures that can change the behavior of light. Moreover, the microstructure 313 is formed on the wall surface 311 by etching, printing, one-piece integration or other methods. The light reflective layer 350 is selectively distributed along the concave-convex lines of the microstructure 313 and filled between the microstructures 313; however, in other embodiments such as the one illustrated in FIG. 10b, the flatness of light reflective layer 350 can be maintained without bending with the microstructure. Moreover, in the embodiment of FIG. 10c, particles 700 of different characteristics (such as diffusion particles) can be mixed and added to the body of the first light-penetrable wall 310 or that of the second light-penetrable wall 320. By mixing the particles 700 in the first light-penetrable wall 310 or the second light-penetrable wall 320, the optical behavior of light reflected by the partition wall 350 can then be adjusted.

Figure 11:
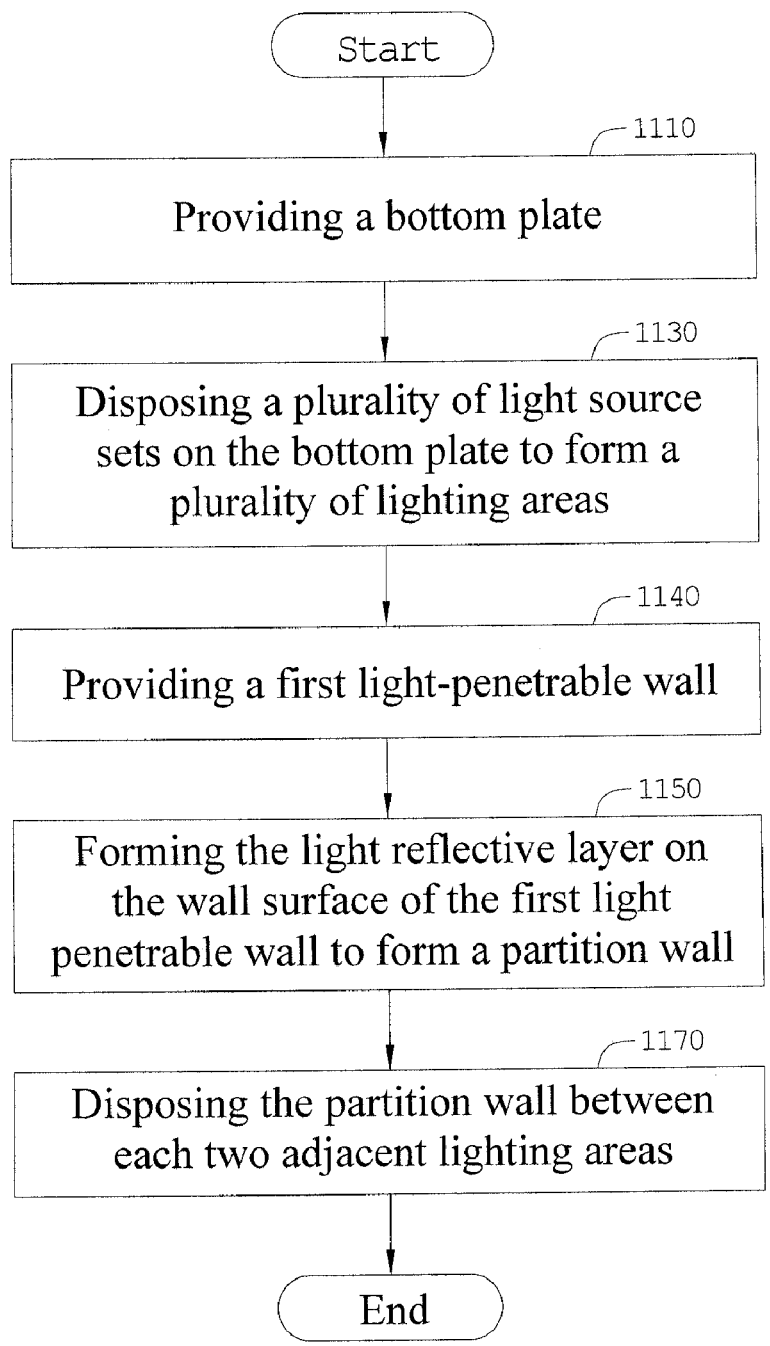
FIG. 11 is the flow chart illustrating a manufacturing method of the backlight module of the present invention.

FIG. 11 is the flow chart of the embodiment of the backlight module manufacturing method provided by the present invention. Step 1110 comprises providing a bottom plate having a plurality of lighting areas thereon. The lighting areas are preferably disposed in an array on the bottom plate; however, in other embodiments, lighting areas can also be disposed in parallel on the bottom plate. Step 1130 comprises disposing a plurality of light source sets on the lighting areas, respectively. The light source sets comprise a plurality of light sources, such as Light-Emitting Diode or other light-emitting elements.

Step 1140 comprises providing a first light-penetrable wall, which includes forming a microstructure on the wall surface. Furthermore, the step of forming the microstructure includes forming the microstructure by means of etching or printing. The microstructure having optical characteristics can be formed on the wall surface of the first light-penetrable walls by etching, printing, one-piece integration or other methods and the light reflective layer is formed on the microstructure.

Step 1150 comprises forming a light reflective layer on a wall surface of the first light-penetrable wall to form at least one partition wall. The first light-penetrable wall is preferably made from polymethylmethacrylate (PMMA), Polycarbonate (PC), glass, polystyrene (PS), the compound of methyl acrylate, methyl acrylate and polystyrene (MS), and other organic or inorganic light-penetrable material or their mixture. The thickness of the first light-penetrable wall is preferably between about 0.2 mm and about 3 mm. The material of the light reflective layer can comprise magnesium oxide compounds, titanium oxide compounds, and other reflective organic or inorganic material. The light reflective layer can also be the diffusion reflective layer or silver reflective layer prepared in advance. The method of forming the light reflective layer on the wall surface of the first light-penetrable wall comprises sputtering, coating, attaching, adhering or other methods and can be adjusted in accordance with light reflective layer's material.

Step 1170 comprises disposing the at least one partition wall between each two adjacent lighting areas. The partition wall can be disposed on the bottom plate by using adhering, screwing or other methods. Moreover, the step of disposing the partition wall includes forming the partition walls in a lattice structure. However, in the preferred embodiment, at least one trough can also be formed by bending, denting or other methods and then the bottom end of the partition wall is inserted into the trough to support and position the partition wall. The trough formed on the bottom plate can enhance the strength of the bottom plate itself at the same time.

Figure 12:
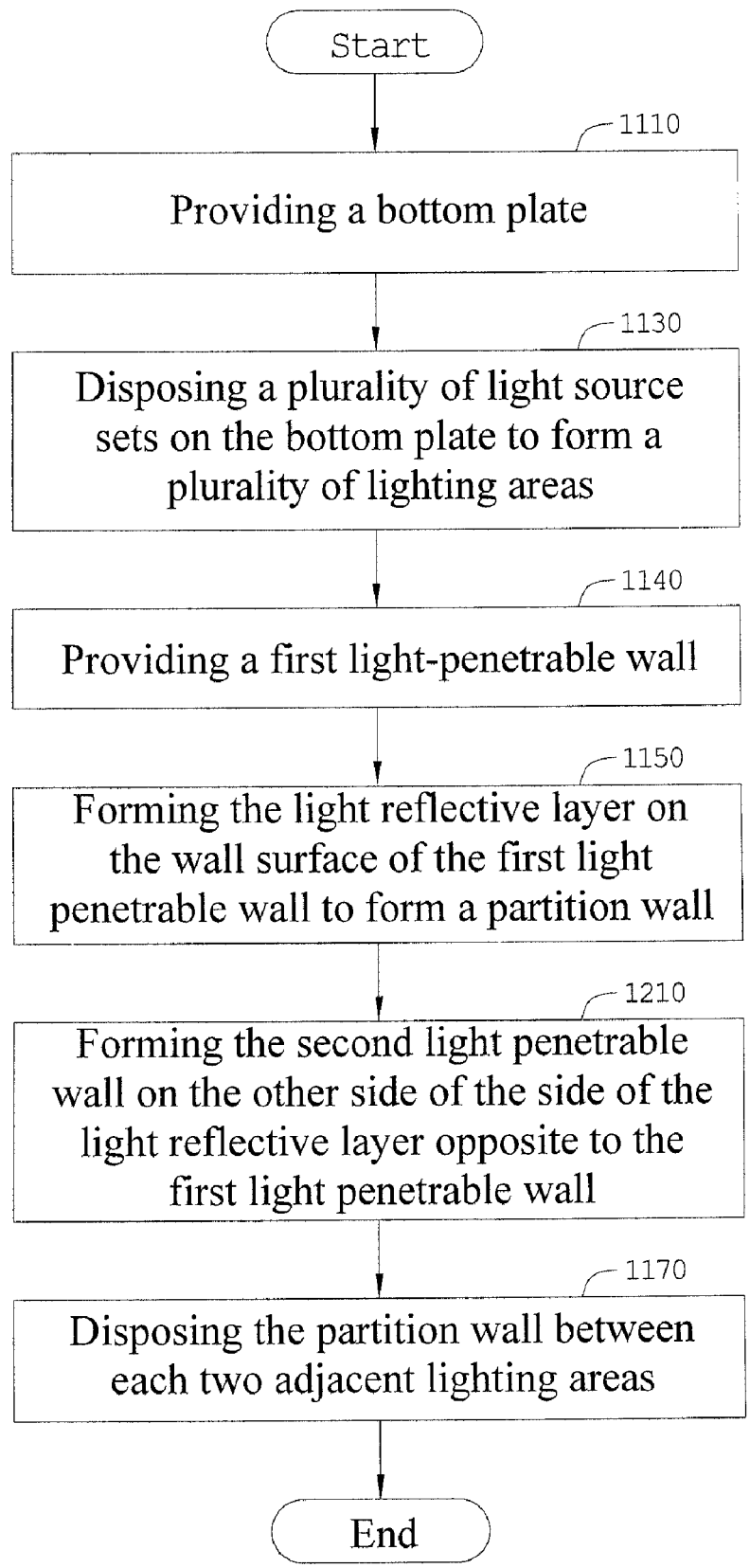
FIG. 12 is a flow chart illustrating another embodiment of the manufacturing method of backlight module.

FIG. 12 is the flow chart of the alternative embodiment of the backlight module manufacturing method provided by the present invention. The backlight module manufacturing method can further include step 1210 of further disposing or forming a second light-penetrable wall on the other side of the side of the light reflective layer opposite to the first light-penetrable wall after step 1150. In other words, light reflective layer is disposed between the first light-penetrable wall and the second light-penetrable wall. The support of the first light-penetrable wall and the second light-penetrable wall allows the light reflective layer to be erected on the bottom plate to reflect the light coming from different lighting areas at both sides of the partition wall.

This invention has been described with the above mentioned embodiments; however, the above mentioned embodiments are only exemplary. What needs to point out is that the disclosed embodiments do not limit the scope of the invention. In contrast, the modifications and equivalents included in the spirit and the scope of the claims are all included in the scope of the present invention.

What is claimed is:
1. A backlight module comprising:
a bottom plate having a plurality of lighting areas thereon;
a plurality of light source sets disposed on the lighting areas respectively; and
at least one partition wall disposed on the bottom plate and located between each adjacent lighting areas, wherein the partition wall is a sandwich structure including:
a first light-penetrable supporting wall having a wall surface vertical to the bottom plate and disposed along an edge of the lighting area;
a second light-penetrable supporting wall having a wall surface vertical to the bottom plate and disposed along the edge of the lighting area; and
a light-reflective layer sandwiched between the wall surfaces of the first light-penetrable supporting wall and the second light-transporting wall;
at least a trough formed on the bottom plate and between the adjacent lighting areas, wherein one end of the partition wall is disposed in the trough; and
a fixing member adjacent to the partition wall and the bottom plate for fixing the partition wall to the bottom plate; wherein the fixing member is attached to the bottom plate with a screw or rivet.

2. The backlight module of claim 1, wherein the lighting areas and the partition wall are disposed in parallel or in an array on the bottom plate.

3. The backlight module of claim 2, wherein the partition wall has a lattice structure.

4. The backlight module of claim 1, wherein the wall surface of the first light-penetrable wall has a microstructure.

5. The backlight module of claim 4, wherein the microstructure comprises an etched microstructure or a printed microstructure.

6. The backlight module of claim 1, wherein a wall surface of the second light-penetrable wall contacting with the light reflective layer has a microstructure.

7. The backlight module of claim 1, wherein the light reflective layer includes a reflective coating.

8. The backlight module of claim 7, wherein the reflective coating includes a magnesia compound or a titania compound film.

9. The backlight module of claim 1, wherein the light reflective layer includes a diffusion reflective layer or a silver reflective layer.

10. The backlight module of claim 1, wherein the first light-penetrable wall is made of materials selected from polymethylmethacrylate (PMMA), Polycarbonate (PC), glass material, and the combination thereof.

11. The backlight module of claim 1, wherein the second light-penetrable wall is made of materials selected from polymethylmethacrylate (PMMA), Polycarbonate (PC), glass material, and the combination thereof.

12. The backlight module of claim 1, wherein a thickness of the first light-penetrable wall is greater than 0.2 mm.

13. The backlight module of claim 10, wherein a thickness of the first light-penetrable wall is less than 3 mm.

14. The backlight module of claim 1, wherein a thickness of the second light-penetrable wall is in a range of about 0.2 mm to about 3 mm.

15. A liquid crystal display comprising the backlight module from claim 1.

16. The backlight module of claim 1, wherein the fixing member fixes the partition wall and the bottom plate with an adhesive.

17. A manufacturing method of a backlight module comprising:
   providing a bottom plate;
   disposing a plurality of light source sets on the bottom plate to form a plurality of lighting areas;
   providing a first light-penetrable wall;
   providing a second light-penetrable wall;
   forming a light reflective layer between the first light-penetrable wall and the second light-penetrable wall to form a partition wall of sandwich structure;
   forming at least one trough on the bottom plate and between each two adjacent lighting areas;
   disposing the partition wall between each two adjacent lighting areas by inserting a bottom end of the partition wall in the trough; and
   disposing a fixing member adjacent to the partition wall and the bottom plate to fix the partition wall and the bottom plate; wherein the fixing member is attached to the bottom plate with a screw or rivet.

18. The manufacturing method of claim 17, wherein the plurality of lighting areas in parallel or in an array on the bottom plate.

19. The manufacturing method of claim 17, wherein the step of disposing the partition wall includes forming the partition walls in a lattice structure.

20. The manufacturing method of claim 17, wherein the step of providing the first light-penetrable wall includes forming a microstructure on the wall surface.

21. The manufacturing method of claim 20, wherein the step of forming the microstructure includes forming the microstructure by means of etching or printing.

22. The manufacturing method of claim 17, wherein the step of forming the light reflective layer on the wall surface of the first light-penetrable wall includes adhering or sputtering the light reflective layer on the wall surface or coating the wall surface with the light reflective layer.

23. The manufacturing method of claim 17, wherein the step of fixing the fixing member to the partition wall and the bottom plate includes fixing the fixing member to the partition wall and the bottom plate with an adhesive.

* * * * *